United States Patent
Gorodyansky et al.

(10) Patent No.: US 10,140,428 B2
(45) Date of Patent: Nov. 27, 2018

(54) SYSTEMS AND METHODS FOR IMPLEMENTING SELF-DESTRUCTING CONTENT LINKS

(71) Applicant: ANCHORFREE INC., Mountain View, CA (US)

(72) Inventors: David Gorodyansky, San Francisco, CA (US); Eugene Molobrodsky, Mountain View, CA (US); Eugene Lapidous, Saratoga, CA (US); Anton Vishnyak, San Jose, CA (US)

(73) Assignee: ANCHORFREE INC., Redwood City, CA (US)

( * ) Notice: Subject to any disclaimer, the term of this patent is extended or adjusted under 35 U.S.C. 154(b) by 0 days.

(21) Appl. No.: 14/556,091

(22) Filed: Nov. 28, 2014

(65) Prior Publication Data

US 2015/0213236 A1 Jul. 30, 2015

Related U.S. Application Data

(60) Provisional application No. 61/909,739, filed on Nov. 27, 2013.

(51) Int. Cl.
 *G06F 21/10* (2013.01)
 *G06F 21/62* (2013.01)

(52) U.S. Cl.
 CPC .............. *G06F 21/10* (2013.01); *G06F 21/62* (2013.01); *G06F 21/6209* (2013.01); *G06F 21/6218* (2013.01); *G06F 2221/07* (2013.01)

(58) Field of Classification Search
 CPC .......... G06F 21/00; G06F 21/10; G06F 21/60; G06F 21/62; G06F 21/6218; G06F 2221/07; G06F 21/6209
 See application file for complete search history.

(56) References Cited

U.S. PATENT DOCUMENTS

| | | | | |
|---|---|---|---|---|
| 2007/0259654 A1* | 11/2007 | Oijer | ...................... | H04L 51/38 455/415 |
| 2008/0320417 A1* | 12/2008 | Begley | ................. | G06Q 10/107 715/822 |
| 2012/0079023 A1* | 3/2012 | Tejada-Gamero | ..... | G06Q 50/01 709/204 |

* cited by examiner

*Primary Examiner* — Ayoub Alata
(74) *Attorney, Agent, or Firm* — TransPacific Law Group; Pavel I. Pogodin

(57) ABSTRACT

A computer-implemented method performed in a computerized system incorporating a central processing unit, a network interface and a memory, the computer-implemented method involving: using the network interface to receive a content and an associated access restriction from a client computer system directly accessible by a user; causing the received content to be stored in a content storage system; using the central processing unit to generate a self-destructing content link for the stored content based on the received associated access restriction, wherein the generated self-destructing content link is configured to de-activate pursuant to the received associated access restriction; storing a metadata corresponding to the generated self-destructing content link for the stored content; and using the network interface to provide the generated self-destructing content link to the client computer system. The content storage system may be an online content storage system accessible via a network or a local content storage system.

10 Claims, 8 Drawing Sheets

SYSTEMS AND METHODS FOR IMPLEMENTING SELF-DESTRUCTING CONTENT LINKS

CROSS-REFERENCE

This non-provisional patent application is based on and claims the benefit of priority from U.S. provisional patent application No. 61/909,739 filed on Nov. 27, 2013, the entire disclosure of which is incorporated by reference herein.

BACKGROUND OF THE INVENTION

Technical Field

The disclosed embodiments relate in general to Internet technology and, more specifically, to systems and methods for implementing self-destructing links for content such as, images, videos, text messages, and emails.

Description of the Related Art

Internet links, also referred to as uniform resource locators (URLs), are often used to share web content, such as URLs, images, videos, text messages, and emails, between Internet users. Links can be easily sent via email, chart, instant message and any other suitable means. When the Internet user clicks on the link, his or her browser accesses the Internet resource associated with the link and displays it to the user.

In many cases, it is desirable for users to place certain restrictions on the access to Internet content given to other users. For example, it may be desirable to limit the time period during which the other users may access the specific shared Internet resource. Unfortunately, conventional Internet links cannot be used by the Internet users to enable flexible content access restrictions. Accordingly, new and improved technology for sharing Internet content and providing flexible access control thereto is needed.

SUMMARY OF THE INVENTION

The embodiments described herein are directed to methods and systems that substantially obviate one or more of the above and other problems associated with conventional systems and methods for sharing Internet content.

In accordance with one aspect of the embodiments described herein, there is provided a computer-implemented method performed in a computerized system comprising a central processing unit, a network interface and a memory, the computer-implemented method involving: using the network interface to receive a content and an associated access restriction from a client computer system directly accessible by a user; causing the received content to be stored in a content storage system; using the central processing unit to generate a self-destructing content link for the stored content based on the received associated access restriction, wherein the generated self-destructing content link is configured to de-activate pursuant to the received associated access restriction; storing a metadata corresponding to the generated self-destructing content link for the stored content; and using the network interface to provide the generated self-destructing content link to the client computer system.

In one or more embodiments, the content storage system is an online content storage system accessible via a network using a uniform resource locator addressing.

In one or more embodiments, the content storage system is a local content storage system.

In one or more embodiments, the content is a textual content.

In one or more embodiments, the content is a graphical content.

In one or more embodiments, the method further involves causing a user interface to be generated on the client computer system, the user interface comprising a first input element for receiving the content and a second input element for receiving the associated access restriction from the user.

In one or more embodiments, the associated access restriction comprises an information on a time period after which the self-destructing content link is deactivated.

In one or more embodiments, the associated access restriction comprises an information on a number of content accesses after which the self-destructing content link is deactivated.

In one or more embodiments, the associated access restriction comprises a user access list comprising identities of users with permissions to access the content. In one or more embodiments, the content is masked or altered for other users not on the user access list.

In accordance with another aspect of the embodiments described herein, there is provided a computer-implemented method performed in a computerized system comprising a central processing unit, a network interface and a memory, the computer-implemented method involving: receiving an access request for a content from a client computer system directly accessible by a user, the access request being based on a self-destructing content link; retrieving a metadata corresponding to the self-destructing content link from a metadata store; using the retrieved metadata to determine if the self-destructing content link is active; and if it is determined that the self-destructing content link is active, retrieving the content from a content storage system and providing the retrieved content to the client computer system.

In one or more embodiments, the method further involves, if it is determined that the self-destructing content link is not active, deleting the content from the content storage system.

In one or more embodiments, the method further involves causing a user interface to be generated on the client computer system, the user interface displaying the retrieved content to the user.

In one or more embodiments, the method further involves authenticating the user before providing the retrieved content to the client computer system.

In accordance with yet another aspect of the embodiments described herein, there is provided a non-transitory computer-readable medium embodying a set of computer-executable instructions, which, when executed in a computerized system comprising a central processing unit, a network interface and a memory, cause the computerized system to perform a method involving: using the network interface to receive a content and an associated access restriction from a client computer system directly accessible by a user; causing the received content to be stored in a content storage system; using the central processing unit to generate a self-destructing content link for the stored content based on the received associated access restriction, wherein the generated self-destructing content link is configured to de-activate pursuant to the received associated access restriction; storing a metadata corresponding to the generated self-destructing content link for the stored content; and using the network interface to provide the generated self-destructing content link to the client computer system.

In one or more embodiments, the content storage system is an online content storage system accessible via a network using a uniform resource locator addressing.

In one or more embodiments, the content storage system is a local content storage system.

In one or more embodiments, the content is a textual content.

In one or more embodiments, the content is a graphical content.

In one or more embodiments, the method further involves causing a user interface to be generated on the client computer system, the user interface comprising a first input element for receiving the content and a second input element for receiving the associated access restriction from the user.

In one or more embodiments, the associated access restriction comprises an information on a time period after which the self-destructing content link is deactivated.

In one or more embodiments, the associated access restriction comprises an information on a number of content accesses after which the self-destructing content link is deactivated.

In one or more embodiments, the associated access restriction comprises a user access list comprising identities of users with permissions to access the content. In one or more embodiments, the content is masked or altered for other users not on the user access list.

In accordance with one aspect of the embodiments described herein, there is provided a computerized system comprising a central processing unit, a network interface and a memory storing a set of instructions executable by the central processing unit, the set of instructions including instructions for: using the network interface to receive a content and an associated access restriction from a client computer system directly accessible by a user; causing the received content to be stored in a content storage system; using the central processing unit to generate a self-destructing content link for the stored content based on the received associated access restriction, wherein the generated self-destructing content link is configured to de-activate pursuant to the received associated access restriction; storing a metadata corresponding to the generated self-destructing content link for the stored content; and using the network interface to provide the generated self-destructing content link to the client computer system.

In one or more embodiments, the set of instructions further includes instructions for causing a user interface to be generated on the client computer system, the user interface comprising a first input element for receiving the content and a second input element for receiving the associated access restriction from the user.

In one or more embodiments, the associated access restriction comprises an information on a time period after which the self-destructing content link is deactivated.

In one or more embodiments, the associated access restriction comprises an information on a number of content accesses after which the self-destructing content link is deactivated.

In one or more embodiments, the associated access restriction comprises a user access list comprising identities of users with permissions to access the content. In one or more embodiments, the content is masked or altered for other users not on the user access list.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there are provided systems and methods for enabling users to create and share self-destructing links for Internet content such as URLs, images, videos, text messages, and emails. In one or more embodiments, the system generates short URLs for each of these content types. In one or more embodiments, these URLs expire after a self-destruct condition set by the owner is satisfied.

Figure 1:
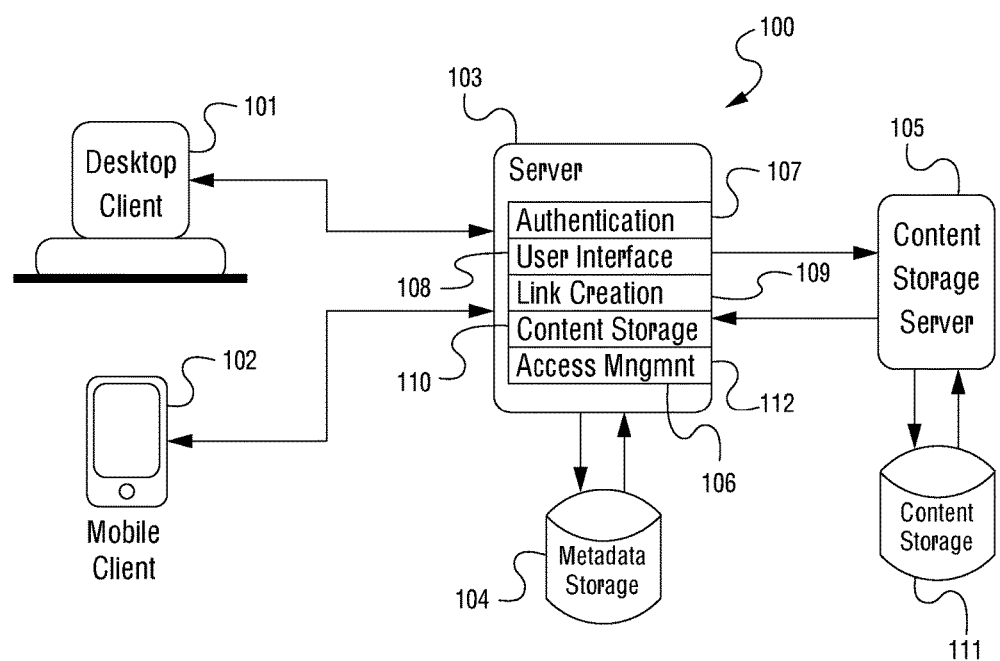
FIG. 1 illustrates an exemplary embodiment of a distributed computerized system for implementing self-destructing content links.

FIG. 1 illustrates an exemplary embodiment of a distributed computerized system 100 for implementing self-destructing content links. As shown in FIG. 1, users access a server 103 by means of clients 101 and 102. The client 101 is a desktop-form factor client, while client 102 is a mobile client. The desktop client 101 executes a web browser application (not shown), which enables access to the server 103 via an HTTP protocol, well known in the art. Exemplary embodiments of the aforesaid web browser application include Apple Safari, Firefox, Google Chrome and Microsoft Internet Explorer, all of which are well known to persons of ordinary skill in the art. On the other hand, the mobile client 102 may execute a custom mobile application specially designed for accessing the functionality provided by the server 103. In an alternative embodiment, the user may access the server 103 using a mobile web browser application executing on the mobile client 102.

In one or more embodiments, the server 103 incorporates a memory 106, which stores a number of software modules. In one or more embodiments, the stored software modules include an authentication module 107, which is configured to receive login credentials from the client 101 and to authenticate the user based on the received login credentials. The memory 106 may further store a user interface generation module 108, which is configured to generate an inventive web-based user interface described in detail below in connection with FIGS. 6 and 7. The aforesaid user interface generated by the user interface generation module 108 may be used by the users to create and/or modify the self-destructing content links and to provide or upload the corresponding content. In one or more embodiments, the user interface generation module is deployed on a web server operating in conjunction with associated server-side scripts, such as PHP scripts, well know to persons of ordinary skill in the art. In one or more embodiments, the aforesaid web server may be of any known of later developed type, including, without limitation, Apache, Microsoft IIS, nginx, Google GWS, lighttpd and Sun Microsystems SunOne.

The memory 106 may further store a link creation module 109, which is configured to receive the access restriction information from the users by means of the user interface generated by the user interface generation module 108, to create the corresponding self-destructing links using the access restrictions specified by the users and to store the corresponding link metadata in a metadata storage 104. The link metadata stored in the metadata storage 104 may include the conditions for destroying the content link, such as content access time limitations or number of content accesses limitations. In one or more embodiments, the metadata storage 104 is implemented using a database management system, such as a relational or non-relational database management systems well known to persons of ordinary skill in the art. Specifically, the database management system may be of any known of later developed type including, without limitation, Redis, Oracle DBMS, Access and SQL Server from Microsoft, DB2 from IBM and the Open source DBMS MySQL.

In addition, the content storage module 110 may be provided for receiving the content from the user and causing the received content to be stored at an appropriate storage location. In one or more embodiments, the received content may be stored in an online content storage system, which may be implemented by means of a content storage server 105 and associated content storage 111. Exemplary embodiments of the online content storage usable in connection with the described techniques include dropbox, Google drive and the like. In such online content storage systems, the stored content may be retrieved over a network by means of a uniform resource locator (URL). Yet additionally, the memory 106 may store a content access management module 112 for managing access to the stored content based on the self-destructing content links. In one or more embodiments, the content access management module 112 is configured to use the URL of the stored content to provide the stored content to the user.

Figure 2:
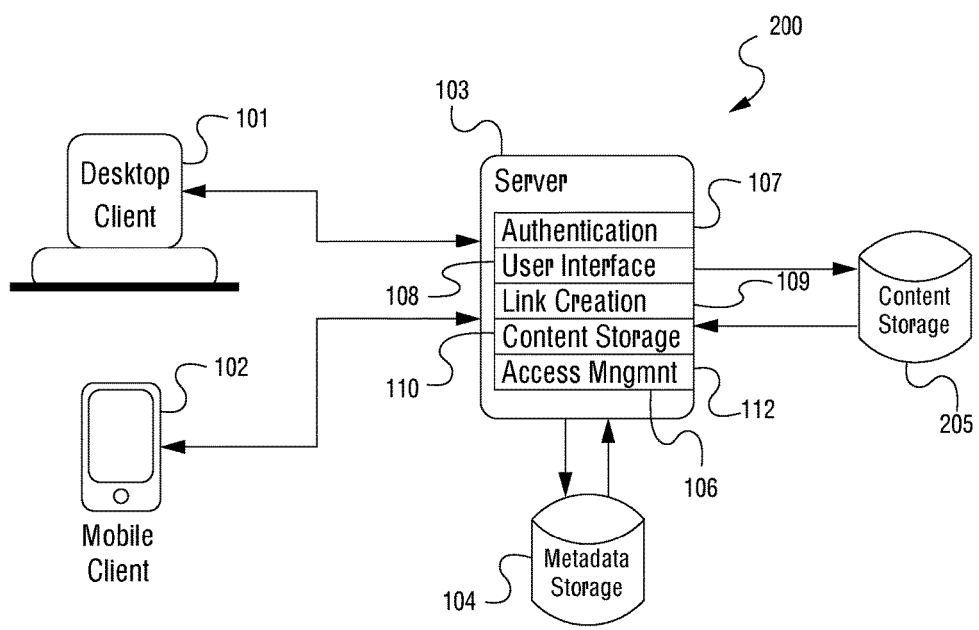
FIG. 2 illustrates another exemplary embodiment of a distributed computerized system for implementing self-destructing content links.

FIG. 2 illustrates another exemplary embodiment 200 of a distributed computerized system for implementing self-destructing links. In the embodiment 200 shown in FIG. 2, the content received from the users is stored not in an online content storage, but in the local content storage 205 associated with the server 103. In this embodiment, the content access management module 112 is configured to retrieve the content from the local content storage 205 and to provide it to the user. The remaining elements of the embodiment 200 shown in FIG. 2 are similar to those of the embodiment 100 shown in FIG. 1.

Figure 3:
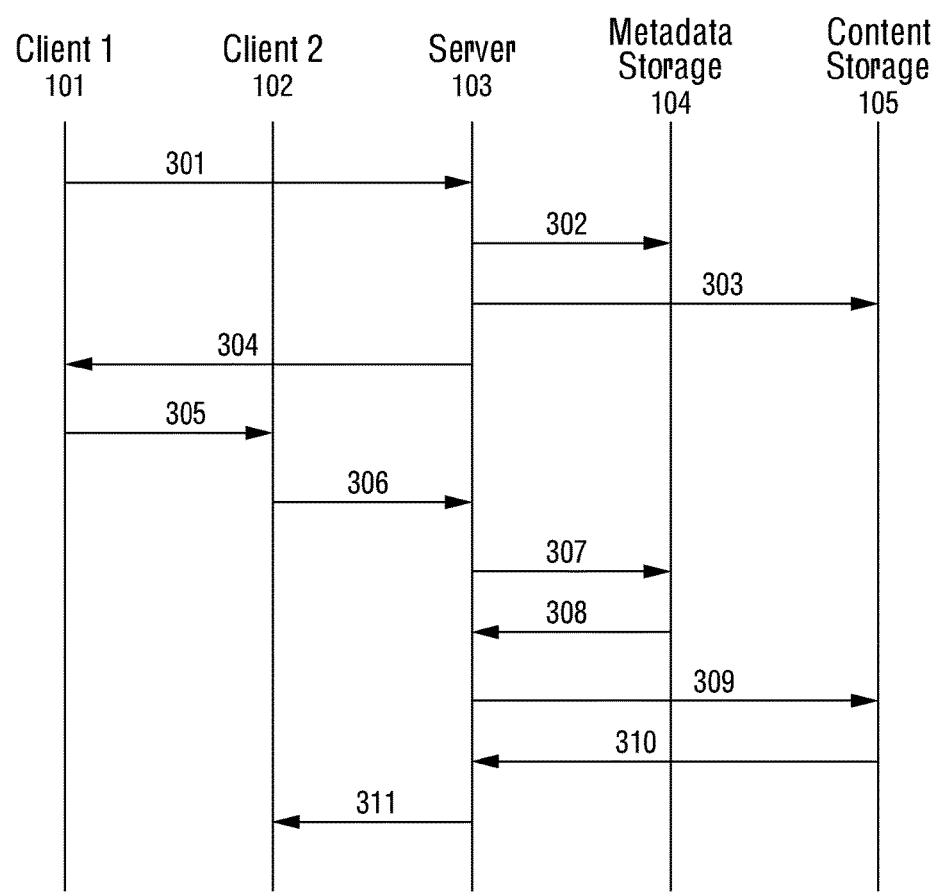
FIG. 3 illustrates exemplary data flows between different modules a distributed computerized system for implementing self-destructing content links.

FIG. 3 illustrates exemplary data flows between different modules a distributed computerized system for implementing self-destructing content links illustrated in the previous two figures. First, as shown in FIG. 3, the user sends the content and the information on the associated content access restrictions 301 from the client system 101 to the server 103 using the user interface generated by the user interface generation module 108. In response, the server 103 creates the self-destructing content link based on the content access restrictions specified by the user and stores the corresponding content link metadata 302 in the metadata storage 104. In addition, the server 103 stores the content 303 received from the client 101 in the online content storage 105 or the local content storage 205. Finally, the server 103 returns the generated self-destructing content link 304 to the client 101.

Upon receiving the self-destructing content link from the sever 101, the client 101 provides the received self-destructing content link 305 to the second client 102. The client 102 accesses the content referenced by the self-destructing content link, which results in the client 102 sending a request 306 to the server 103. Upon receiving the content access request, the server 103 sends request 307 for the metadata corresponding to the self-destructing content link to the metadata storage 104, which returns the metadata 308 corresponding to the self-destructing content link back to the server 103. The server 103 uses the received metadata 308 to determine whether the self-destructing content link is active.

If it is determined that the self-destructing content link is active, the server 103 sends the request 309 for the stored content to the content storage 105. In response, the content storage 105 returns the requested stored content 310 to the server 103. The server 103 subsequently returns the content 311 to the requesting client 102. To this end, in one embodiment, the retrieved content may be sent to the requesting client 102 either separately or as a part of the web user interface generated by the user interface generation module 108.

If it is determined that the self-destructing content link is not active, the server 103 returns an error message (not shown) to the requesting client 102. In another embodiment, the server 103 returns to the requesting client 102 not the content itself, but only a content URL and the requesting client 102 itself retrieves the content from the online content storage 105 using the received content URL.

Figure 4:
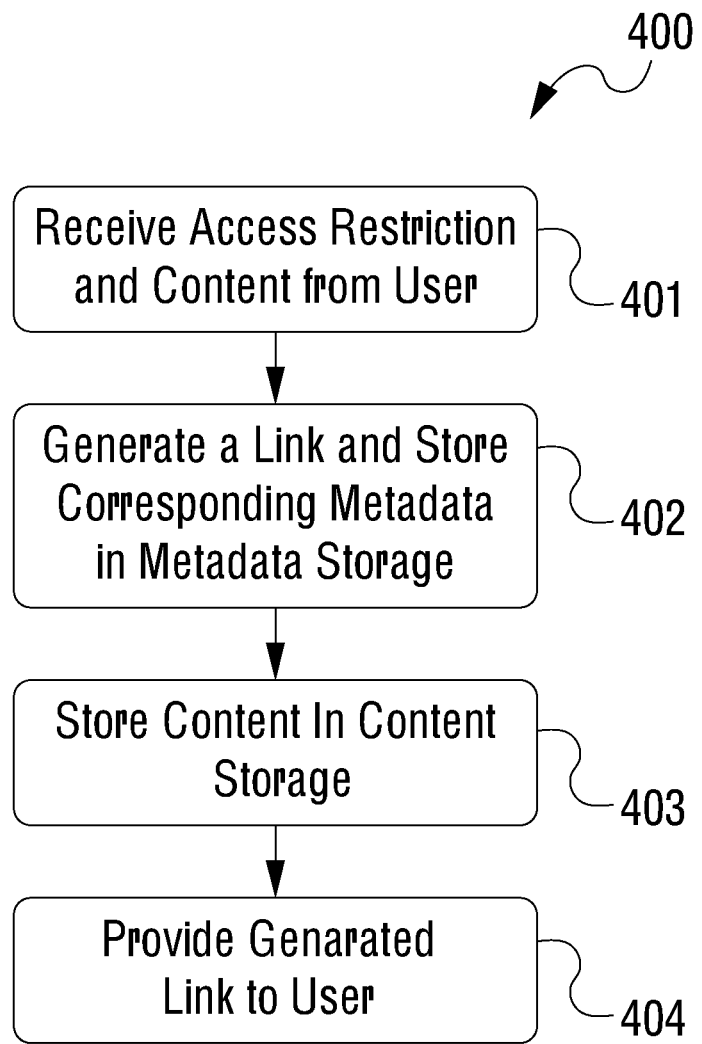
FIG. 4 illustrates an exemplary embodiment of an operating sequence of a distributed computerized system for implementing self-destructing content links.

FIG. 4 illustrates an exemplary embodiment of an operating sequence 400 of a distributed computerized system for implementing self-destructing content links. Specifically, the sequence 400 relates to creation of self-destructing content links. At step 401, the user sends the content and the information on the associated content access restrictions from the client system 101 to the server 103 using the user interface generated by the user interface generation module 108. In response, at step 402, the server 103 creates the self-destructing content link based on the content access restrictions specified by the user and stores the corresponding content link metadata in the metadata storage 104. In addition, at step 403, the server 103 stores the content received from the client 101 in the online content storage 105 or the local content storage 205. Finally, at step 404, the server 103 returns the generated self-destructing content link to the client 101. To facilitate sharing the content, the user of the client system 101 forwards the received self-destructing content link to another user, which uses the client system 102.

Figure 5:
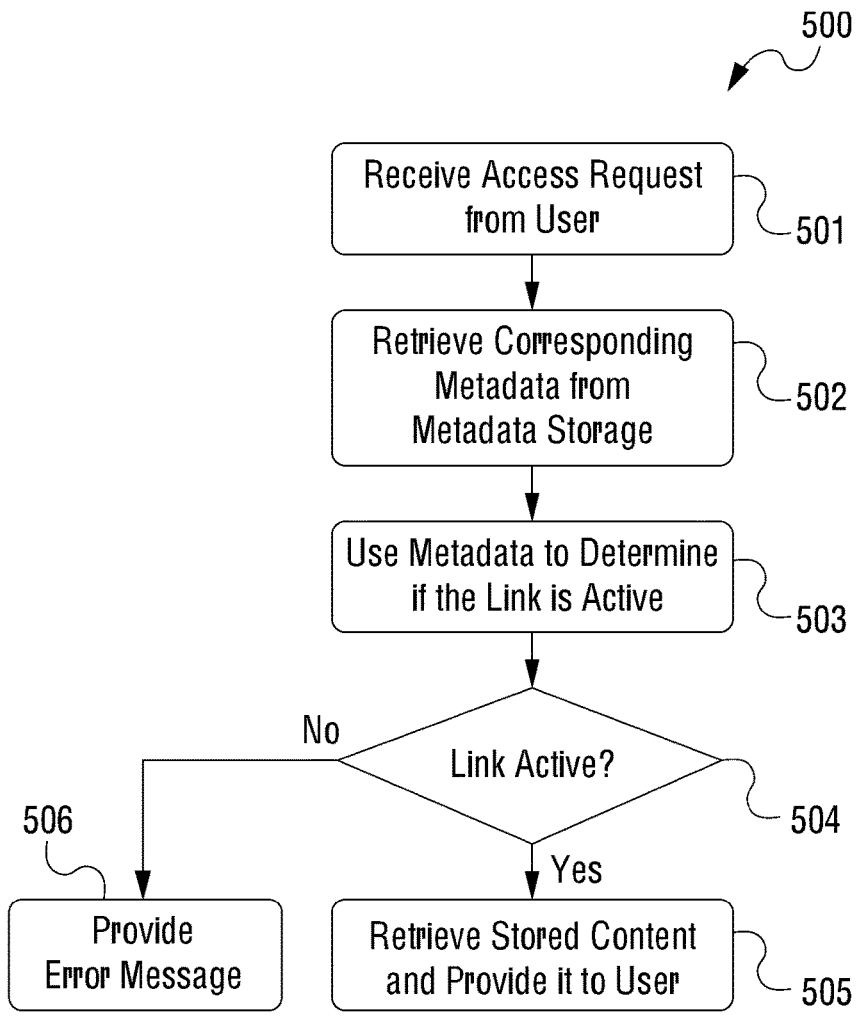
FIG. 5 illustrates another exemplary embodiment of an operating sequence of a distributed computerized system for implementing self-destructing content links.

FIG. 5 illustrates another exemplary embodiment 500 of an operating sequence of a distributed computerized system for implementing self-destructing content links. At step 501, the server 103 receives a request for the content from the client system 102 operated by the second user. The aforesaid content request is based on the generated self-destructing content link. At step 502, the server 103 retrieves the metadata corresponding to the self-destructing content link from the metadata storage 104. The retrieve metadata is used to determine, at step 503, if the self-destructing content link is active. If the self-destructing content link is active (decision block 504), the server 103 retrieves the content from the online content storage 105 or the local content storage 205 and provides the retrieved content to the user of the client system 102. Otherwise, an error message is sent, see step 506.

Figure 6:
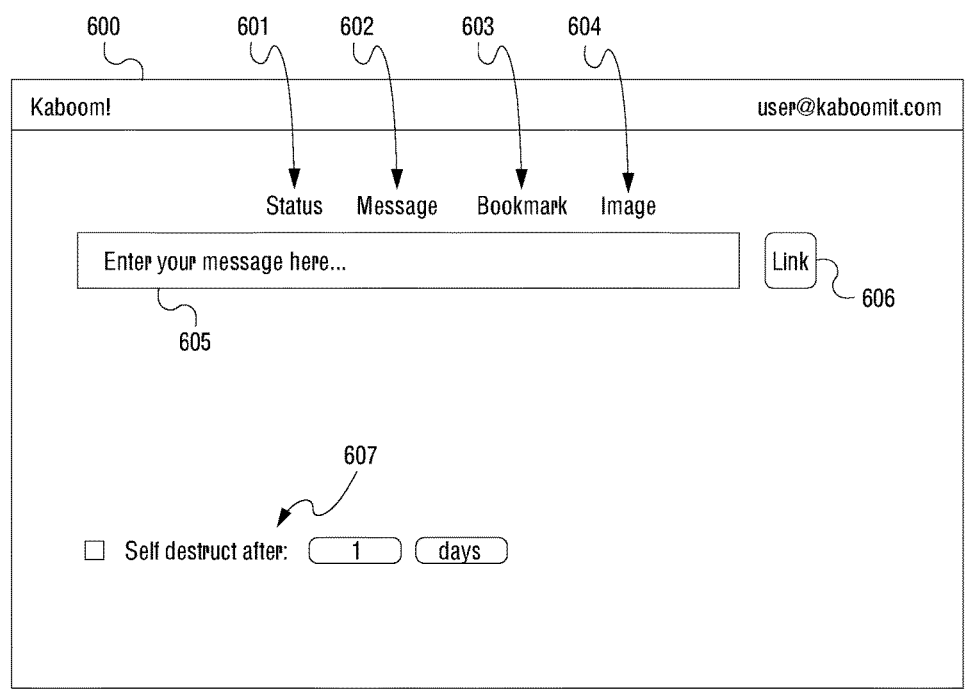
FIG. 6 illustrates an exemplary embodiment of a web user interface of a distributed computerized system for implementing self-destructing content links.

FIG. 6 illustrates an exemplary embodiment 600 of a web user interface of a distributed computerized system for implementing self-destructing content links. In the shown embodiment, the web user interface incorporates content selection controls 601, 602, 603 and 604 for selecting the type of content provided by the user. The exemplary types of content include status 601, message (email) 602, bookmark (link) 603, as well as image and/or video 604. The status content may refer to any text that user would like to share online on a forum, social network, or any other online meeting place. The link content 603 may refer to any URL that user would like to share online on a forum, social network, or any other online meeting place. The image content may refer to either a directly uploaded image or a direct link (URL) to an image stored elsewhere online. The user can upload the image to an online storage, such as Dropbox, by authorizing the inventive content storage module 110 described herein to access the corresponding user's dropbox account. In one or more embodiments, the content storage module 110 is configured to delete the content from the online storage location, such as dropbox folder, after the expiration of the access criteria set by user. In one or more embodiments, all images whose self-destructible links are generated by the link creation module 109 are modified such that any recipient of the link would not be able to save the picture in a recognizable format. However, in one or more embodiments, the recipients can still take screenshots. In one or more embodiments, the video content may refer to a direct link to video available online, such as on a video sharing site such as youtube, well known to persons of ordinary skill in the art. The email content may refer to any text that a user would like to send as an email message. In one or more embodiments, all such text content with links are generated by the link creation module 109 are modified such that any recipient of the link would not be able to save the text in a recognizable format.

Based on the type of content selected by the user using the selection controls 601, 602, 603 and 604, the user either directly inputs the content into the content input field 605 or uploads the content to the server 103 using the upload menu (not shown). Graphical user interface controls 607 are used to specify the destruction criteria for the self-destructing content link. Specifically, in one embodiment, the user can select time period of time after which the link to the content becomes inactive. In the same or different embodiment, the user can select the number of content views after which the link to the content becomes inactive.

Figure 7:
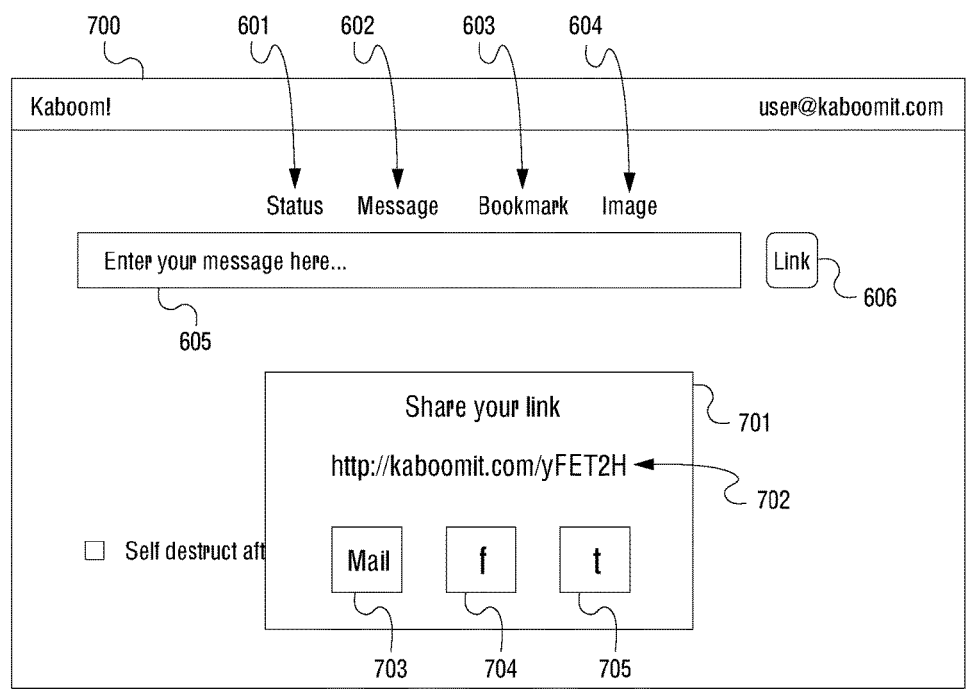
FIG. 7 illustrates another exemplary embodiment of a web user interface of a distributed computerized system for implementing self-destructing content links.

Finally, when the user activates the link button 606, the content and the corresponding access restriction is sent to the server 103 and the self-destructing link to the content is generated based on the selected link destruction criteria. FIG. 7 illustrates another exemplary embodiment 700 of a web user interface of a distributed computerized system for implementing self-destructing content links. As shown in FIG. 7, after the user activates the link button 606, a window 701 opens presenting the generated self-destructing content link 702 to the user. In addition, the user is provided with control elements 703, 704 and 705 for sharing the generated self-destructing content link on social networks (704 and 705) or incorporating it into an email message (703). For example, when the user activates the control element 703, an email message is automatically generated and presented to the user in an appropriate email message editor, the generated email message including the self-destructing content link. In one or more embodiments, in addition to providing the functionality for creating the self-destructing content links, the inventive user interface is also configured to display the shared content. Thus, the server 103 may be used by users for content sharing.

In one or more embodiments, the user can choose to share the content in two different content sharing modes. In a permissive content sharing mode, the content is shared with anyone who simply clicks the content link and any user clicking the content link is able to view the content. On the other hand, in a non-permissive content sharing mode, anyone who clicks the self-destructing content link would be required to first authenticate with the authentication module 107 running on the server 103 before viewing the linked content.

In one or more embodiments, the described system additionally provides the ability for users to organize their links into "views" and share these "views". A "view" is defined as a collection of various self-destructing content links. These links may be images, texts, or videos. For instance, a user can generate a "party" view and upload all the videos and pictures to that view. In one or more embodiments, the user can either make the view "public" where anyone who has the link to the view will be able to add content, or "private" where only invited users will be able to add content to views.

In one or more embodiments, all or portion of the functionality described herein is deployed based on a web browser plugin. The plugin, when installed on the client systems 101 or 102, may automatically replace all the conventional social network content share buttons on the websites with a special share button configured to share the described self-destructing content links. Specifically, the plugin may be configured to protect user privacy by optionally offering to automatically convert social media interactions via share and like buttons into self-destructing links. In one or more embodiments, hovering any link on a webpage will bring an option to share the content on the server 103 as an overlay. In one or more embodiments, selecting any text or link on web will bring an option to share the content using the server 103 as an overlay.

Figure 8:
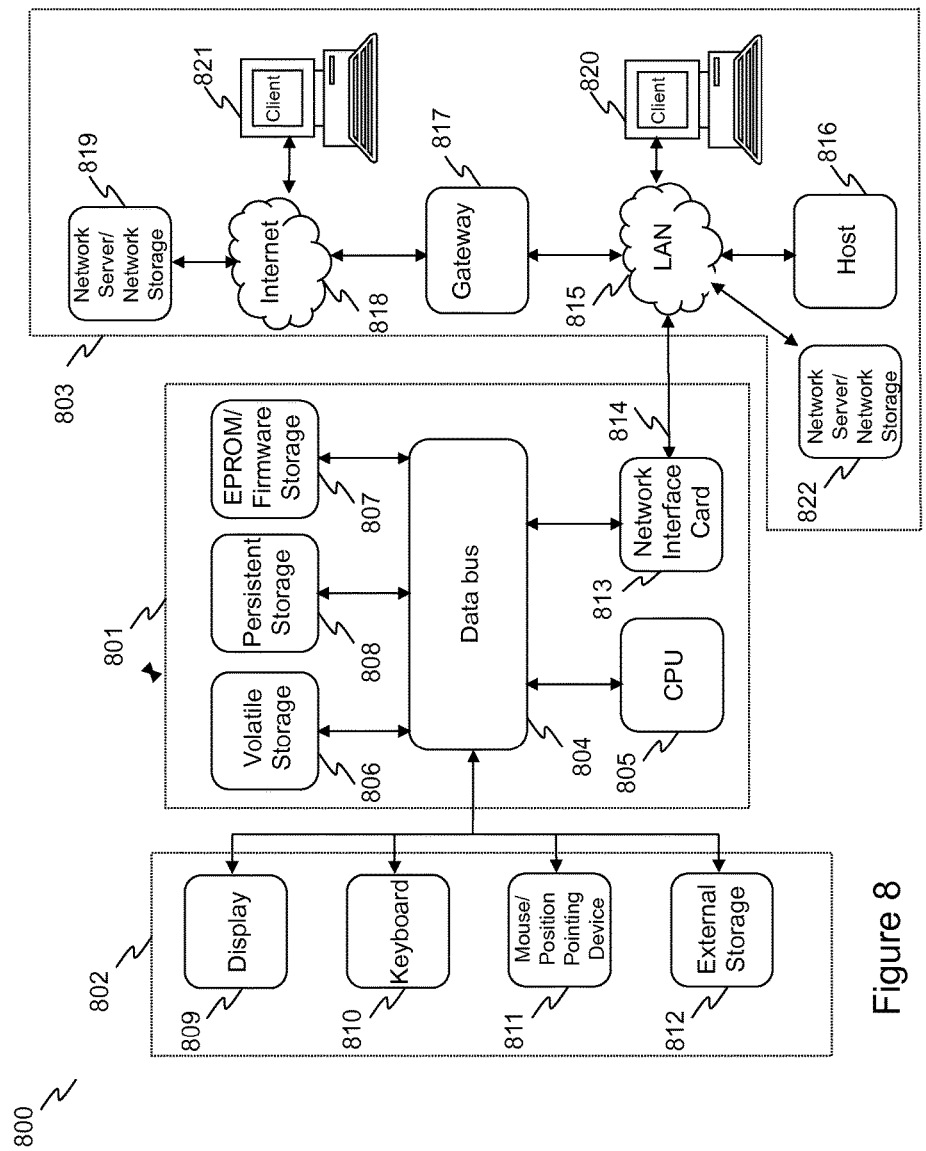
FIG. 8 illustrates an exemplary embodiment of a computer platform whereupon the various embodiments described herein may be implemented.

FIG. 8 is a block diagram that illustrates an embodiment of a computer system 800 upon which various embodiments of the inventive concepts described herein may be implemented. The system 800 includes a computer platform 801, peripheral devices 802 and network resources 803.

The computer platform 801 may include a data bus 804 or other communication mechanism for communicating information across and among various parts of the computer platform 801, and a processor 805 coupled with bus 804 for processing information and performing other computational and control tasks. Computer platform 801 also includes a volatile storage 806, such as a random access memory (RAM) or other dynamic storage device, coupled to bus 804 for storing various information as well as instructions to be executed by processor 805, including the software application for proxy detection described above. The volatile storage 806 also may be used for storing temporary variables or other intermediate information during execution of instructions by processor 805. Computer platform 801 may further include a read only memory (ROM or EPROM) 807 or other static storage device coupled to bus 804 for storing static information and instructions for processor 805, such as basic input-output system (BIOS), as well as various system configuration parameters. A persistent storage device 808, such as a magnetic disk, optical disk, or solid-state flash memory device is provided and coupled to bus 804 for storing information and instructions.

Computer platform 801 may be coupled via bus 804 to a touch-sensitive display 809, such as a cathode ray tube (CRT), plasma display, or a liquid crystal display (LCD), for displaying information to a system administrator or user of the computer platform 801. An input device 810, including alphanumeric and other keys, is coupled to bus 804 for communicating information and command selections to processor 805. Another type of user input device is cursor control device 811, such as a mouse, a trackball, or cursor direction keys for communicating direction information and command selections to processor 805 and for controlling cursor movement on touch-sensitive display 809. This input device typically has two degrees of freedom in two axes, a first axis (e.g., x) and a second axis (e.g., y), that allows the device to specify positions in a plane. To detect user's gestures, the display 809 may incorporate a touchscreen interface configured to detect user's tactile events and send information on the detected events to the processor 805 via the bus 804.

An external storage device 812 may be coupled to the computer platform 801 via bus 804 to provide an extra or removable storage capacity for the computer platform 801. In an embodiment of the computer system 800, the external removable storage device 812 may be used to facilitate exchange of data with other computer systems.

The invention is related to the use of computer system 800 for implementing the techniques described herein. In an embodiment, the inventive system may reside on a machine such as computer platform 801. According to one embodiment of the invention, the techniques described herein are performed by computer system 800 in response to processor 805 executing one or more sequences of one or more instructions contained in the volatile memory 806. Such instructions may be read into volatile memory 806 from another computer-readable medium, such as persistent storage device 808. Execution of the sequences of instructions contained in the volatile memory 806 causes processor 805 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 805 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 808. Volatile media includes dynamic memory, such as volatile storage 806.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 805 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 804. The bus 804 carries the data to the volatile storage 806, from which processor 805 retrieves and executes the instructions. The instructions received by the volatile memory 806 may optionally be stored on persistent storage device 808 either before or after execution by processor 805. The instructions may also be downloaded into the computer platform 801 via Internet using a variety of network data communication protocols well known in the art.

The computer platform 801 also includes a communication interface, such as network interface card 813 coupled to the data bus 804. Communication interface 813 provides a two-way data communication coupling to a network link 814 that is coupled to a local network 815. For example, communication interface 813 may be an integrated services digital network (ISDN) card or a modem to provide a data communication connection to a corresponding type of telephone line. As another example, communication interface 813 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 813 sends and receives electrical, electromagnetic or optical signals that carry digital data streams representing various types of information.

Network link 814 typically provides data communication through one or more networks to other network resources. For example, network link 814 may provide a connection through local network 815 to a host computer 816, or a network storage/server 822. Additionally or alternatively, the network link 814 may connect through gateway/firewall 817 to the wide-area or global network 818, such as an Internet. Thus, the computer platform 801 can access network resources located anywhere on the Internet 818, such as a remote network storage/server 819. On the other hand, the computer platform 801 may also be accessed by clients located anywhere on the local area network 815 and/or the Internet 818. The network clients 820 and 821 may themselves be implemented based on the computer platform similar to the platform 801.

Local network 815 and the Internet 818 both use electrical, electromagnetic or optical signals that carry digital data streams. The signals through the various networks and the signals on network link 814 and through communication interface 813, which carry the digital data to and from computer platform 801, are exemplary forms of carrier waves transporting the information.

Computer platform 801 can send messages and receive data, including program code, through the variety of network(s) including Internet 818 and LAN 815, network link 815 and communication interface 813. In the Internet example, when the system 801 acts as a network server, it might transmit a requested code or data for an application program running on client(s) 820 and/or 821 through the Internet 818, gateway/firewall 817, local area network 815 and communication interface 813. Similarly, it may receive code from other network resources.

The received code may be executed by processor 805 as it is received, and/or stored in persistent or volatile storage devices 808 and 806, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for implementing self-destructing links. It is intended that the specification and examples be considered as exemplary only, with a true scope and spirit of the invention being indicated by the following claims.

What is claimed is:

1. A computer-implemented method performed in a computerized system comprising a central processing unit, a network interface and a memory, the computer-implemented method comprising:
   a. using the network interface to receive a content and an associated access restriction from a client computer system directly accessible by a sending user;
   b. causing the received content to be stored in a content storage system, wherein the content storage system is a local content storage system of the sending user;
   c. using the central processing unit to generate a self-destructing content link for the stored content based on the received associated access restriction, wherein the generated self-destructing content link is configured to de-activate pursuant to the received associated access restriction, and wherein the associated access restriction comprises an information on a number of content accesses after which the self-destructing content link is deactivated;
   d. storing a metadata corresponding to the generated self-destructing content link for the stored content;
   e. using the network interface to provide the generated self-destructing content link to the client computer system; and
   f. causing a user interface to be generated on the client computer system, the user interface comprising a first input element for receiving the content and a second input element for receiving the associated access restriction from the user.

2. The computer-implemented method of claim 1, wherein the content storage system is an online content storage system accessible via a network using a uniform resource locator addressing.

3. The computer-implemented method of claim 1, wherein the content is a textual content.

4. The computer-implemented method of claim 1, wherein the content is a graphical content.

5. The computer-implemented method of claim 1, wherein the associated access restriction comprises an information on a time period after which the self-destructing content link is deactivated.

6. A non-transitory computer-readable medium embodying a set of computer-executable instructions, which, when executed in a computerized system comprising a central processing unit, a network interface and a memory, cause the computerized system to perform a method comprising:
   a. using the network interface to receive a content and an associated access restriction from a client computer system directly accessible by a sending user;
   b. causing the received content to be stored in a content storage system, wherein the content storage system is a local content storage system of the sending user;
   c. using the central processing unit to generate a self-destructing content link for the stored content based on the received associated access restriction, wherein the generated self-destructing content link is configured to de-activate pursuant to the received associated access restriction, and wherein the associated access restriction comprises an information on a number of content accesses after which the self-destructing content link is deactivated;
   d. storing a metadata corresponding to the generated self-destructing content link for the stored content;
   e. using the network interface to provide the generated self-destructing content link to the client computer system; and
   f. causing a user interface to be generated on the client computer system, the user interface comprising a first input element for receiving the content and a second input element for receiving the associated access restriction from the user.

7. The computer-implemented method of claim 6, wherein the content storage system is an online content storage system accessible via a network using a uniform resource locator addressing.

8. The computer-implemented method of claim 6, wherein the associated access restriction comprises an information on a time period after which the self-destructing content link is deactivated.

9. A computerized system comprising a central processing unit, a network interface and a memory storing a set of instructions executable by the central processing unit, the set of instructions comprising instructions for:
   a. using the network interface to receive a content and an associated access restriction from a client computer system directly accessible by a sending user;
   b. causing the received content to be stored in a content storage system, wherein the content storage system is a local content storage system of the sending user;
   c. using the central processing unit to generate a self-destructing content link for the stored content based on the received associated access restriction, wherein the generated self-destructing content link is configured to de-activate pursuant to the received associated access restriction, and wherein the associated access restriction comprises an information on a number of content accesses after which the self-destructing content link is deactivated;
   d. storing a metadata corresponding to the generated self-destructing content link for the stored content;
   e. using the network interface to provide the generated self-destructing content link to the client computer system; and
   f. causing a user interface to be generated on the client computer system, the user interface comprising a first input element for receiving the content and a second input element for receiving the associated access restriction from the user.

10. The computerized system of claim 9, wherein the associated access restriction comprises an information on a time period after which the self-destructing content link is deactivated.

* * * * *